Figure 1:
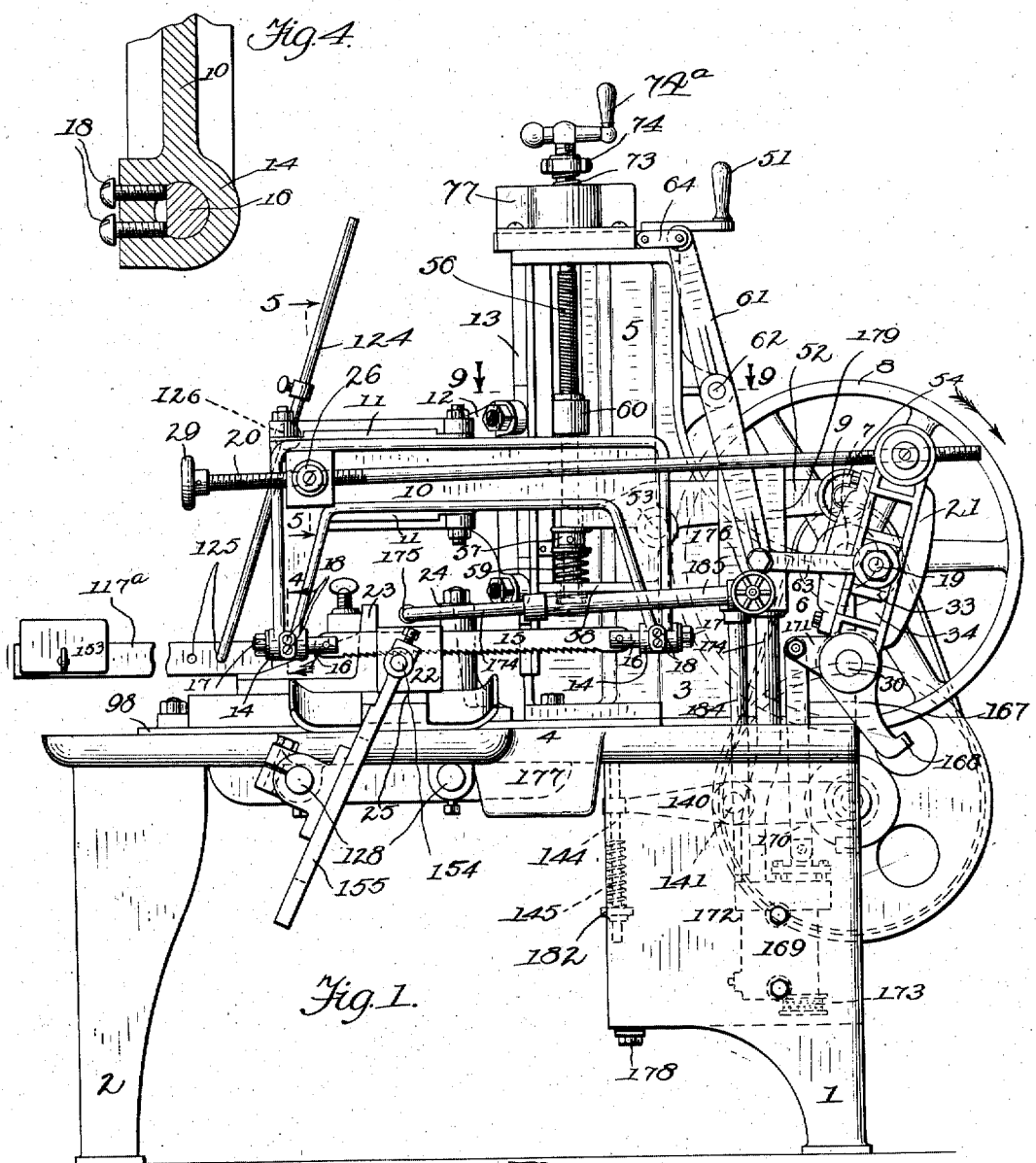

G. J. BLUM.
POWER HACKSAW.
APPLICATION FILED MAR. 30, 1912.
1,201,244.
Patented Oct. 17, 1916.
6 SHEETS—SHEET 3.
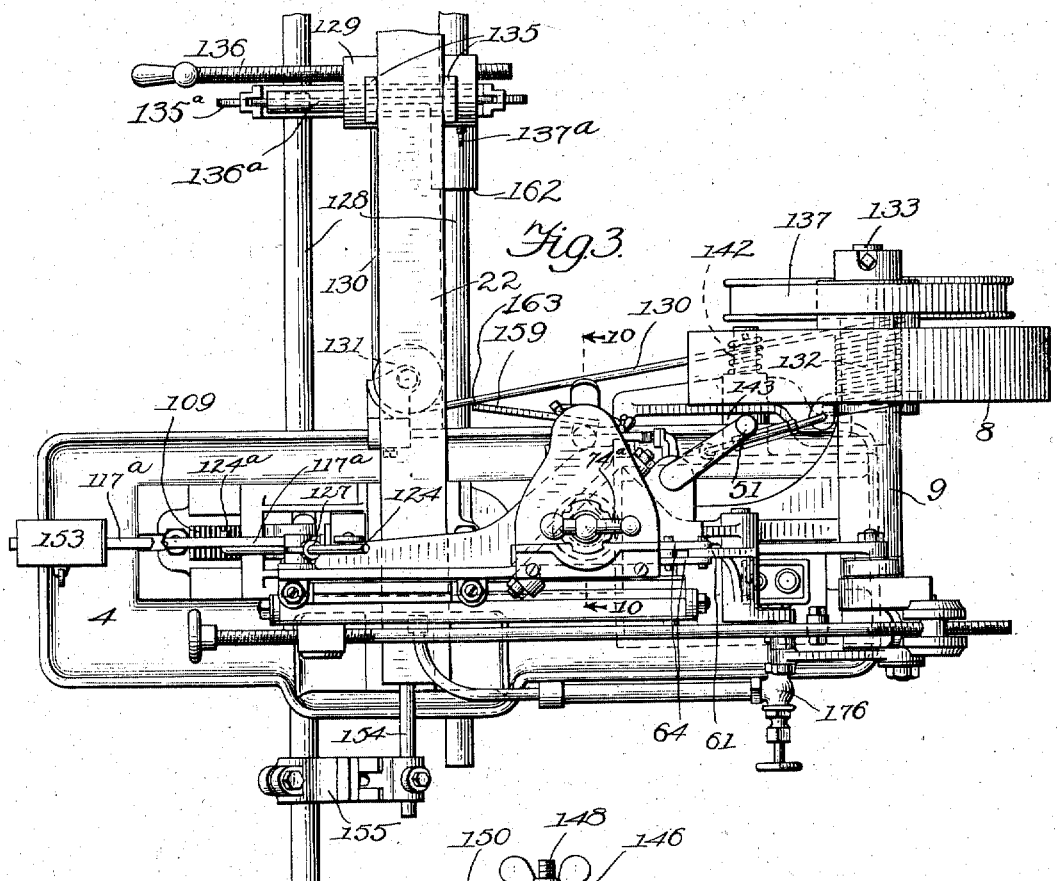
Fig. 3.
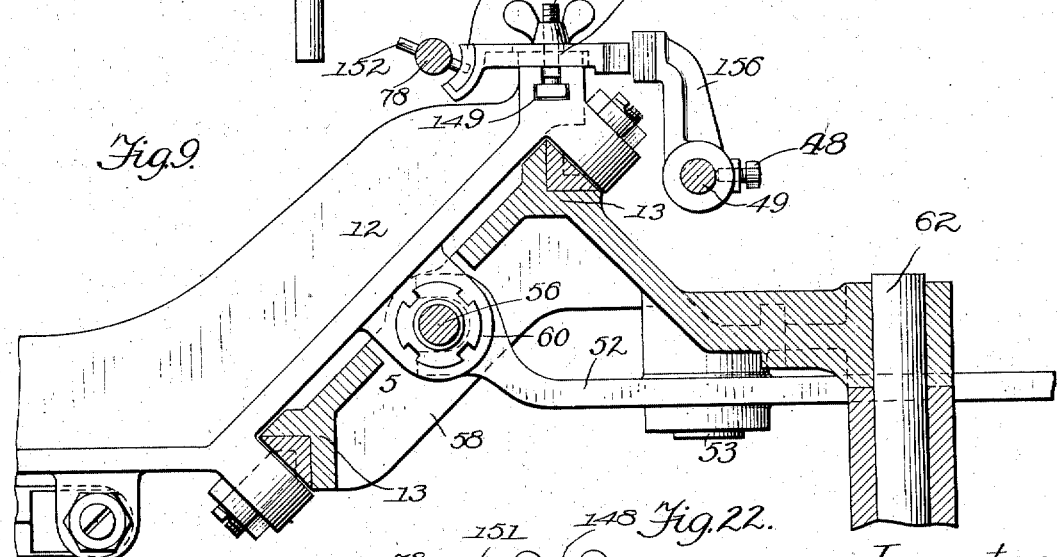
Fig. 9.
Fig. 22.
Witnesses:
J. C. Devick
C. Paul Carker
Inventor:
George J. Blum
By Luther L. Miller
Atty.

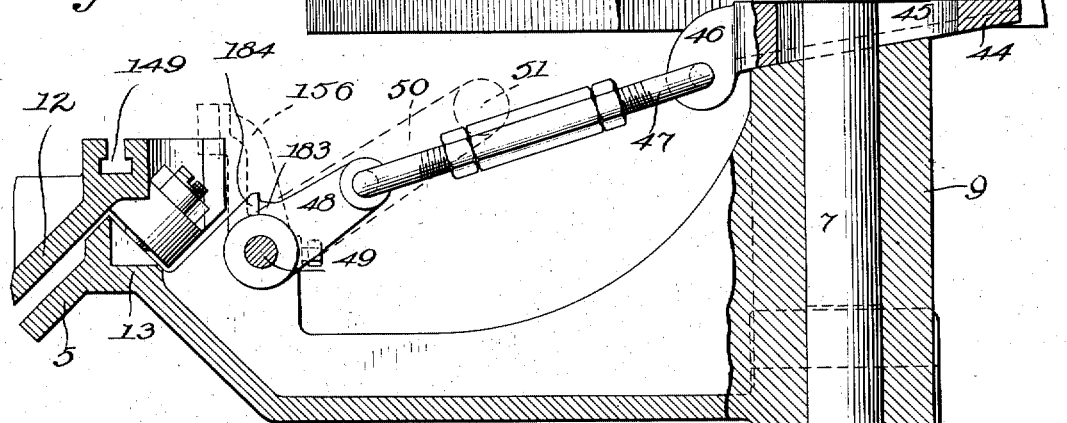

G. J. BLUM.
POWER HACKSAW.
APPLICATION FILED MAR. 30, 1912.
1,201,244.
Patented Oct. 17, 1916.
6 SHEETS—SHEET 5.
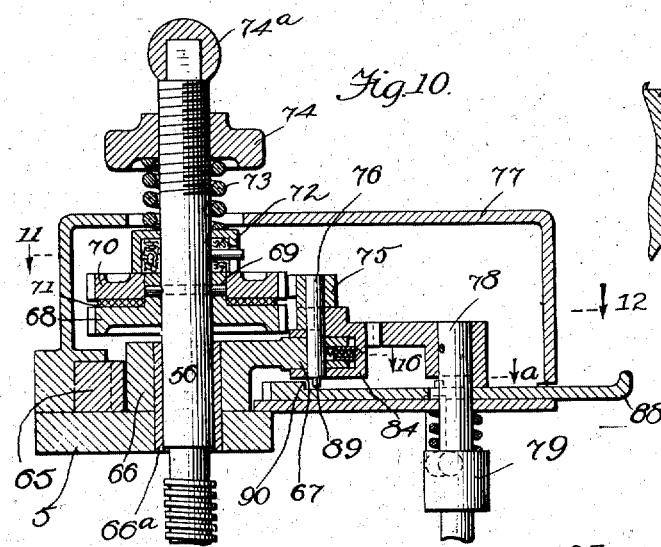
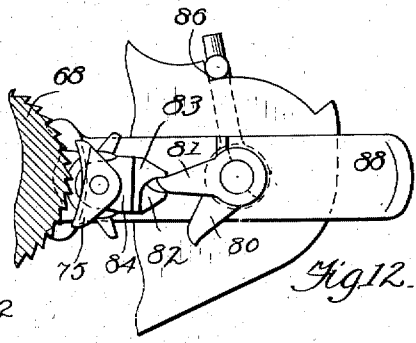
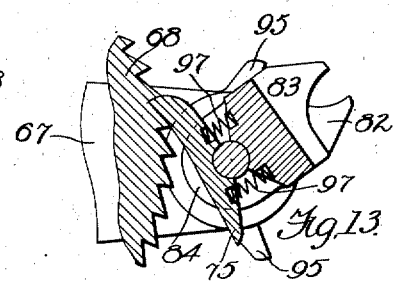
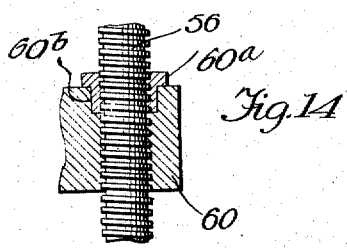
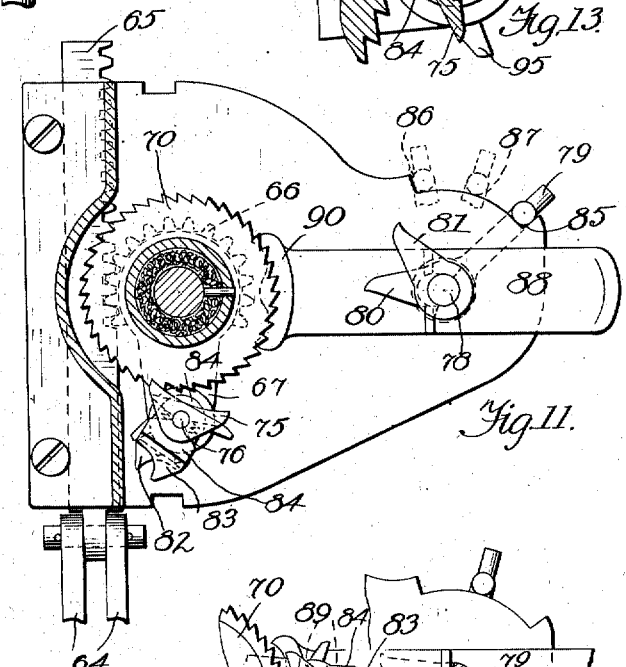
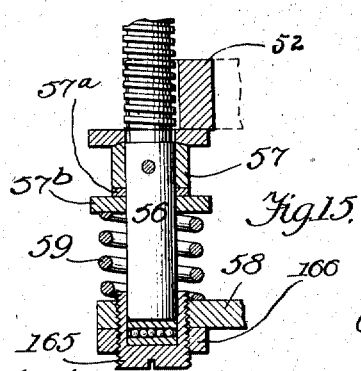
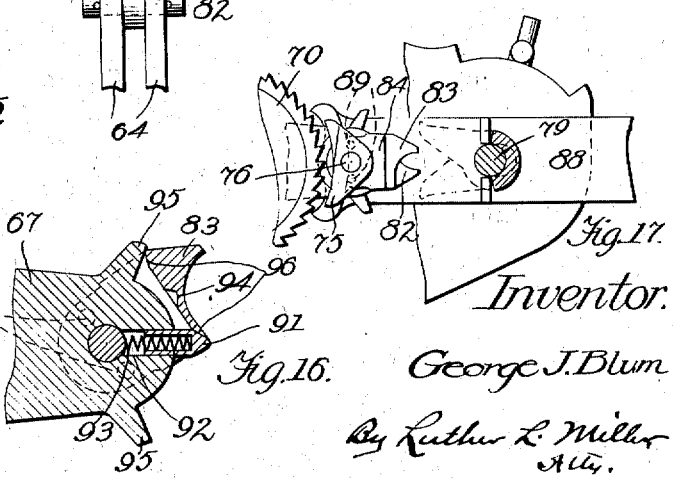
Witnesses:
J. C. Devich.
G. Paul Carker.
Inventor.
George J. Blum
By Luther L. Miller
Atty.

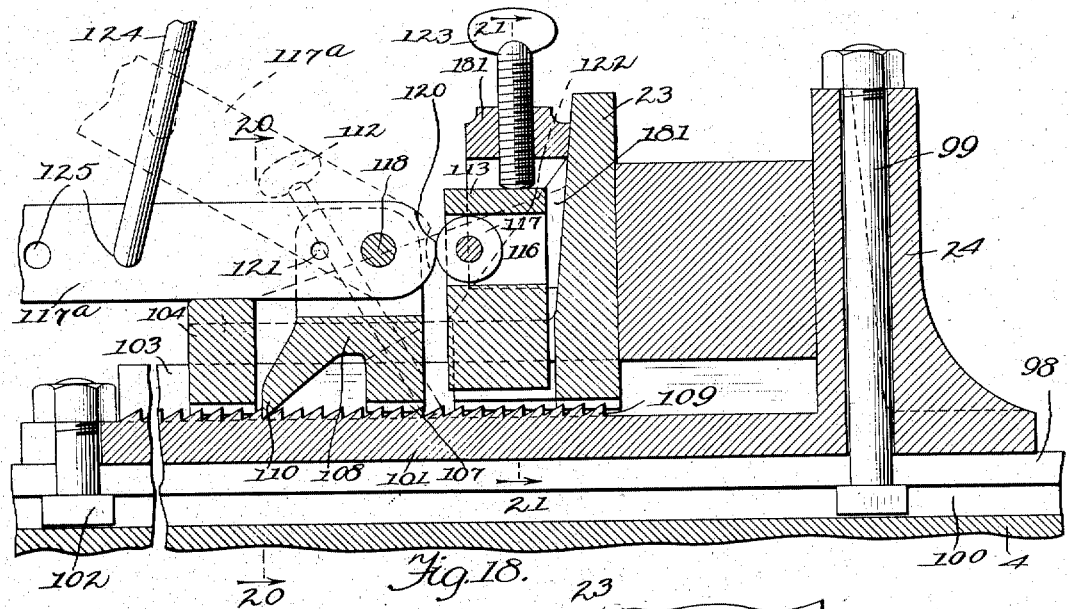
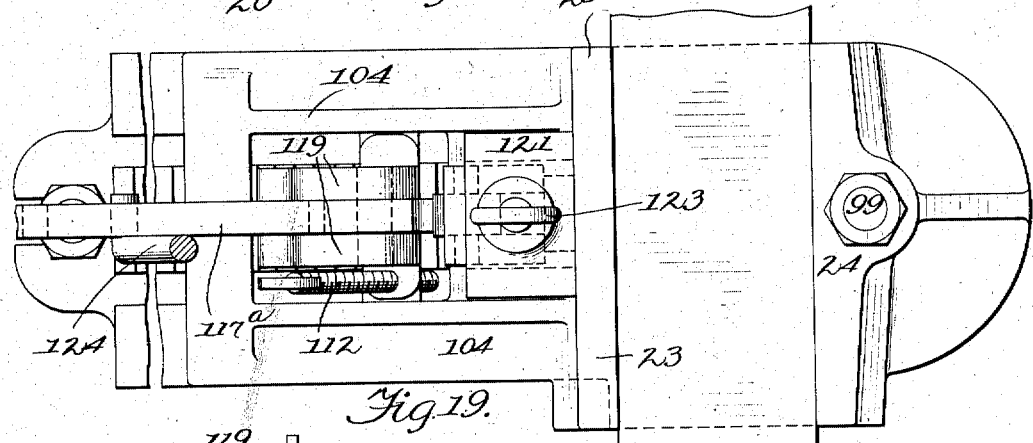
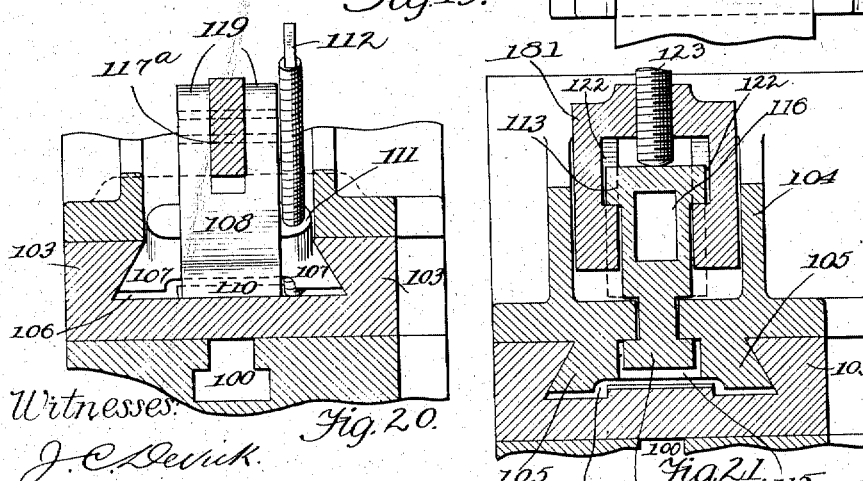

UNITED STATES PATENT OFFICE.

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

POWER-HACKSAW.

1,201,244.          Specification of Letters Patent.          Patented Oct. 17, 1916.

Application filed March 30, 1912. Serial No. 687,344.

*To all whom it may concern:*

Be it known that I, GEORGE J. BLUM, a citizen of the United States, residing at Chicago, in the county of Cook and State of Illinois, have invented certain new and useful Improvements in Power-Hacksaws, of which the following is a specification.

This invention relates to a machine tool used for the purpose of sawing into desired lengths bars of metal or other material.

One object of the invention is to produce a machine that will be entirely automatic in all respects, it being necessary only to place a bar of material in the machine, make the proper adjustments, and start the operation, and no further attention will be required until the stock is all cut into the desired lengths.

A further object is to produce a machine that may be adjusted to meet any condition that is likely to arise in the ordinary use of a power hacksaw.

One of the automatic features of the machine consists in mechanism by which the holding device is opened and closed at the proper time to release and to clamp the work.

Another automatic feature is mechanism that draws the stock into the vise to the proper position for a new cut.

Another automatic feature is the mechanism which stops the saw when the cut is finished, raises it above the incoming stock, and reverses it to take the new cut when the stock is in place.

Another automatic feature is the raising of the blade from the stock during the back stroke.

Another automatic feature is the mechanism which releases the clutch which operates the machine in case the raising and lowering mechanism fails to work. And another automatic feature is the mechanism which releases the clutch when the desired amount of stock has been sawed into the proper lengths.

Among the adjusting features of my invention is the mechanism by which the pressure on the saw blade, and hence the depth of the cut may be increased or decreased.

Another adjusting feature is the mechanism by which the length of the stroke of the saw may be varied.

Another adjusting feature is the mechanism by which the effective portion of the saw blade may be varied so that the saw may be used uniformly throughout its length.

Other automatic and adjustable features will be described hereinafter in connection with the various details of the machine.

Figure 2:
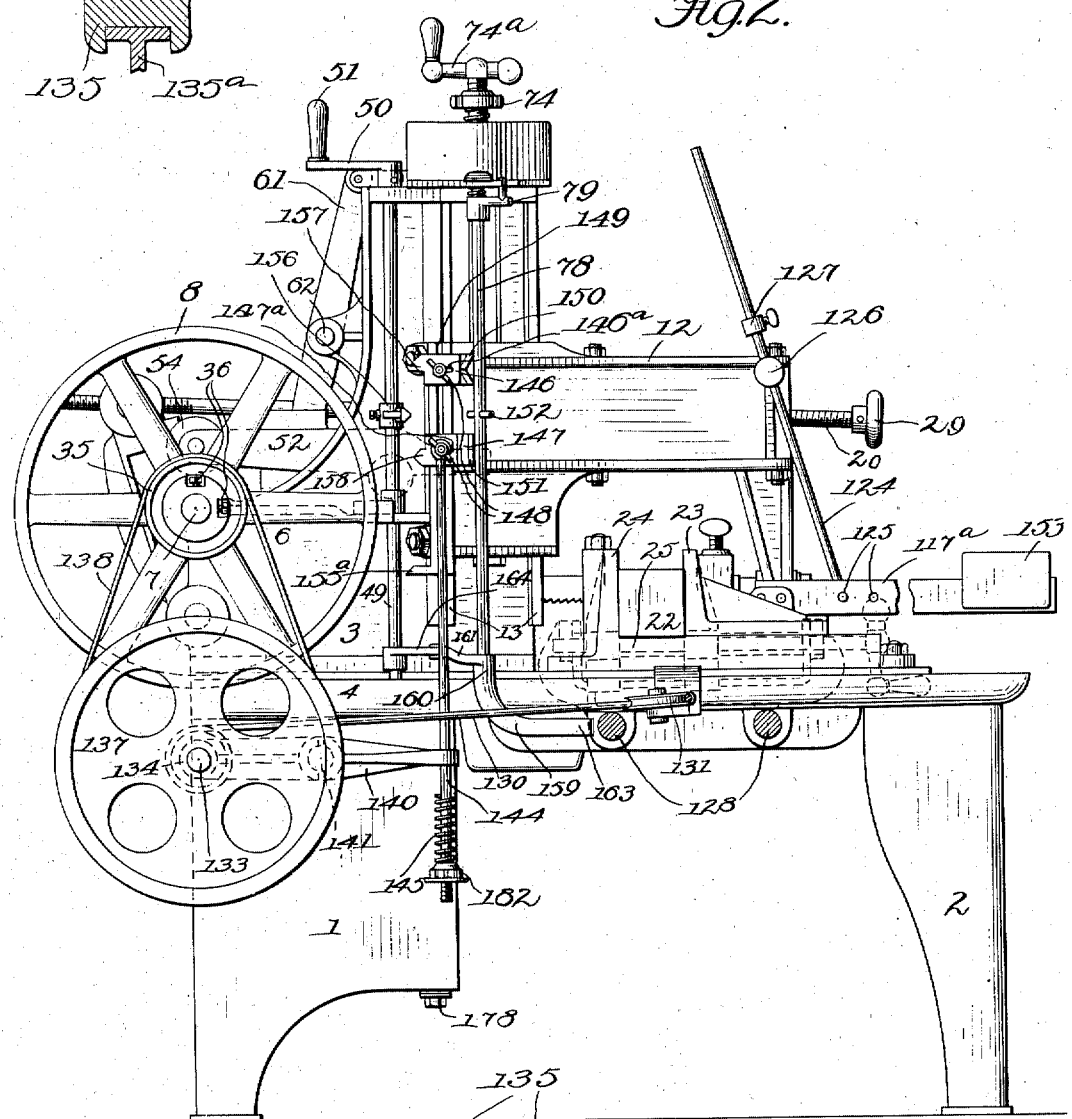

In the accompanying drawings, Figures 1, 2 and 3 are front and rear elevations and a plan view, respectively, of a machine embodying the various features of my invention. Fig. 4 is a vertical section through the means for adjusting the saw blade, taken along the line 4 4 of Fig. 1. Fig. 5 is a vertical section along the line 5 5 of Fig. 1, and illustrating the connection between the saw and its driving link. Fig. 6 is a horizontal section along the driving shaft of the machine. Fig. 7 is a section along the line 7 7 of Fig. 6. Fig. 8 is a section along the line 8 8 of Fig. 6, including the adjacent roller 54. Fig. 9 is a fragmental horizontal section taken in the plane of line 9 9 of Fig. 1, and looking in the direction of the arrows. Figs. 10 to 17, inclusive, show various details of the feeding mechanism, Fig. 10 being a section along the line 10 of Fig. 3. Fig. 11 is a section along the line 11 of Fig. 10 with some of the parts changed in position. Figs. 12 and 13 are sections along the line 12 of Fig. 10 with some of the parts changed in position. Figs. 14 and 15 are detail sections of the feeding screw. Fig. 16 is a section along the line 16 of Fig. 10, and Fig. 17 is a diagrammatic detail of a portion of the feeding mechanism. Fig. 18 is a transverse section of the vise which holds the stock. Fig. 19 is a plan view of the vise. Fig. 20 is a section of the vise along the line 20 20 of Fig. 18. Fig. 21 is a section of the vise along the line 21 21 of Fig. 18. Fig. 22 is a detail view of one of the limit stops. Figs. 23 and 24 are detail views of the vise used in the stock feeding mechanism, Fig. 24 being a section along the line 24 of Fig. 23. Fig. 25 is a reduced sectional view along the line 25 of Fig. 6.

My invention is susceptible of various embodiments, and while I will herein describe in detail the preferred form of the invention shown in the drawings, it should be understood that I do not thereby intend to limit the invention, but propose to cover all modifications and equivalents falling within the scope of the appended claims.

The present machine in general is constructed along the lines of an ordinary power hacksaw, having a saw blade mounted in a frame which is reciprocated horizontally by means of a crank fixed to the driving shaft, with an adjustable vise for holding the stock being operated upon. It has, however, mechanism for automatically raising the saw back to its initial position when a cut is finished; and the saw frame as it rises opens the vise and releases the stock by raising a lever pivoted to the vise. The saw is raised to such a height as to allow the stock to be drawn forward for a new cut, and this drawing in of the stock occurs automatically as soon as the saw is out of the way. The stock is placed in the right position for a new cut, the vise is then closed, and the saw is again fed to the work. This cycle of operations is repeated until the stock is all used up, or so much thereof is cut as may be desired. A catch fixed to the stock feeding mechanism then releases a clutch on the driving shaft and the machine stops.

The machine comprises a suitable framework consisting of a table or bed 4 supported by legs 1 and 2. Rising from the bed 4 near one end thereof is an upright 5 having a shoulder 6 at its lower end, said shoulder having a bearing 9 thereon in which is rotatably mounted the driving shaft 7 of the machine. Loosely mounted on the shaft 7 is the driving pulley 8. The saw frame 10 is slidably supported on horizontal guides 11 on a bracket 12, said bracket being slidably mounted on vertical guides 13 (Figs. 1 and 9) on the upright 5. The saw frame 10 is thus slidable both horizontally and vertically. As shown best in Fig. 9, the main portion of the upright 5 and the guides 13 are positioned diagonally with reference to the bed 4. This facilitates placing the stock at an angle when diagonal cuts are to be made.

The saw blade 15 is attached to the frame 10 by means of pins 16 mounted in bearings 14 on the arms of the frame 10, said pins having nuts 17 threaded thereon at the outer sides of said bearings. If necessary, the saw may be adjusted with reference to a vertical plane by means of screws 18 which act against flat surfaces on the pins 16. When the upper screws are loosened and the lower ones tightened, the top of the blade will be moved outwardly and the bottom inwardly.

The saw is reciprocated horizontally by means of a connecting rod 20 which is attached to the frame 10 and to a rocking arm or link 21. The link 21 is pivoted at one end to the frame shoulder 6 by means of a pivot 30 and is oscillated by the shaft 7 through means to be presently described. The rod 20 is attached to the saw frame and to the link 21 by means of right and left-hand screw threads so that by turning the rod, by means of the hand wheel 29, one way or the other, the frame will be shifted nearer to or farther away from the link 21. By this means different portions of the saw blade may be brought to act upon the material to be cut so that all portions of the blade may be used up uniformly. The material 22 to be cut is held between the jaws 23 and 24 of the vise 25.

The manner of attaching the rod 20 to the saw frame 10 is shown in Fig. 5. The rod is threaded into the wrist pin 26, and also threaded into the wrist pin is a set screw 27 which is backed by a piece of leather 28 or some other equivalent material. By means of this set screw the leather may be pushed against the rod 20 so as to cause sufficient friction to keep the rod from turning. The other end of the rod is attached to the link 21 in a similar manner. When it is desired to change the position of the saw blade with reference to the material being cut, it is necessary only to turn the rod by means of the hand wheel 29, and this may be done readily while the machine is in operation.

The link 21 which is pivoted to the shoulder 6 is operated by the shaft 7 by means of the T-bolt 19 (Fig. 6) playing in an undercut slot 31 in the crank 32 attached to the shaft. The T-bolt 19 passes through a slide 33 playing in a slot 34 of the link 21. The length of the stroke of the saw may be adjusted by changing the effective crank length by shifting the T-bolt in the undercut slot of the crank nearer to or farther away from the shaft.

When the saw is not in operation the pulley 8 rotates on the shaft 7. Clutch mechanism connects the pulley to the shaft when it is desired to operate the saw. This mechanism is shown in Figs. 6 and 7. The hub of a pulley 35 is rigidly attached to the shaft by screws 36. Inclosed by this pulley is a slit collar 37. The hub 38 of the pulley 8 projects into the slit collar and carries therein two roller studs 39. These studs lie between shoulders 41 and 42 on the slit collar 37. The shoulder 42 tapers so that the passageway between the two shoulders has sides converging away from the driving pulley. Hence, if the driving pulley is pushed toward the fixed pulley it will force the studs 39 against the shoulders 41 and 42 of the slit collar and press the collar outwardly against the inner surface of the pulley 35, causing this pulley and the shaft to which it is attached to rotate. A spring 43 presses the driving pulley away from the fixed pulley; but the driving pulley is forced toward the fixed pulley by a wedge-shaped collar 44 encircling the shaft. This collar has a slot 45 to allow sufficient transverse movement on the shaft. A lug 46 on the collar 44 and an adjustable connecting rod 47 connects the collar with a crank 48 on a shaft 49. This shaft has a crank 50 on its upper end which may be operated manually by means of a handle 51 when it is desired to start or stop the machine. As the parts are arranged in Fig. 6 the clutch is locked in operative position, the crank 48 being turned counter-clockwise just beyond the dead center until the shoulder 183 of the crank strikes against the shoulder 184. If it is desired to stop operations, the shaft may be turned clockwise so as to allow the wedge 44 to slip outwardly because of the spring pressure, and thus release the clutch. If it is desired to start the mechanism, the shaft 49 is rotated in the opposite direction to the locked position.

One of the automatic features of my machine is the mechanism used for lifting the saw blade free from the cut on the return stroke. This mechanism comprises a lever 52 (Figs. 1, 8 and 9) pivoted to the upright 5 by the pivot 53. On the outer end of this lever is mounted a roller 54 (Fig. 8) which presses against a cam collar 55 fixed to the driving shaft 7. The other end of the lever is forked, as indicated in Fig. 9, to partially surround a screw feed shaft 56 immediately above a collar 57 fixed on said shaft. This shaft is threaded into a lug 60 fixed to the bracket 12 so that rotation of said shaft will raise or lower the saw frame. An adjusting nut 60ᵃ is threaded onto said screw adjacent to the lug 60, which is used to take up any wear of the threads either of the lug or of the screw; by screwing the nut 60ᵃ downwardly on the screw, any loose play will be taken up in the threads, and as the nut fits snugly in the opening 60ᵇ of the lug, it will not rotate with the screw. The shaft 56 has a slight endwise movement in its bearings. Beneath the collar 57 are a fiber washer 57ᵃ and a metal washer 57ᵇ (Fig. 15). Between the washer 57ᵇ and a horizontal web 58 on the upright 5 is a compression spring 59 encircling the shaft 56 and pressing against the washers and the collar 57 and thus tending to raise the shaft 56. As the roller 54 passes along the periphery of the cam 55, it causes the other end of the lever to rise and sink. As the end rises, the spring 59 is allowed to lift the shaft and hence the bracket 12 along the slides 13 and thereby raise the saw frame 10. As the end of the lever sinks, it forces the shaft, the bracket and the frame downward, overcoming the upward pressure of the spring, and pressing the saw to its work.

The periphery of the cam is so shaped that as the saw blade makes its cutting stroke, the frame is forced downward, feeding the saw to its work, and as it makes the return stroke, the saw is forced upward so that it is not injured by rubbing over the cut.

In order that the saw frame, while the cutting stroke is being taken, may be firmly supported without depending on the spring 59, the lower end of the feed shaft 56 is supported, during the cutting stroke, by an adjustable ball bearing 165 (see Fig. 15) screwed into the web 58 of the upright 5. The bearing is adjustable by means of the screw-thread and is secured against displacement by the lock nut 166. The bearing is of sufficient length to allow the necessary endwise movement of the shaft as caused by the lever 52 and the spring 59. A ball bearing at this point is also desirable so as to reduce the friction of the feed shaft 56, and thus allow the friction ratchet wheel hereinafter described to be sufficiently effective, particularly when the saw is being raised preparatory to taking a new cut, as will be explained hereinafter.

Another feature of my invention is the mechanism used for properly feeding the saw to its work. As above stated, the feed shaft 56 passes through and is threaded into a lug 60 on the bracket 12, so that rotation of the shaft will cause the bracket 12 and the saw frame 10 to be moved vertically. In order to feed the saw to its work, this shaft is automatically rotated in the following manner: A lever 61 pivoted to the upright at the point 62, has its lower end connected by a link 63 to the T-bolt 19. Hence the lever is caused to reciprocate as the shaft 7 rotates. The upper end of the lever 61 is connected by means of the links 64 (Figs. 1, 3 and 11) to a gear rack 65 reciprocally mounted in a suitable guideway on the upper end of the upright 5. Meshing with this rack is a segmental gear wheel 66 loosely encircling a bushing 66ᵃ which is pressed into the upper portion of the frame 5. Projecting from this gear wheel is an arm 67. As the driving shaft 7 rotates, the rack 65 is reciprocated by the lever 61 and this causes the arm 67 to oscillate approximately from the position shown in Fig. 11 to a position substantially diametrically opposite and back during one rotation of the driving shaft. The exact distance through which the arm will oscillate, however, depends upon the position of the T-bolt 19 in the crank slot. Fixed to the shaft 56 and located above, but spaced somewhat from, the gear 66 is a ratchet wheel 68. The distance between the gear 66 and the wheel 68 is sufficient to allow the endwise motion of the shaft hereinbefore mentioned. Above this ratchet wheel, and encircling its hub 69 is another ratchet wheel 70 which is free to rotate on said hub.

Between these wheels is a friction collar 71 composed of fiber, paper or other suitable material. These ratchet wheels are automatically caused to rotate by means hereinafter to be described. Above the ratchet wheel 70, encircling the shaft and slidably but non-rotatably fixed thereto, is an inverted cup-shaped collar 72 filled with cotton waste or other suitable material soaked in oil. Above this is a spring 73 which is compressed between the collar and a thumb nut 74 screwed onto the upper end of the feed shaft.

If the thumb nut 74 is screwed down sufficiently on the spring the friction between the ratchet wheel 70 and the adjacent pieces will be sufficient to cause the feed shaft to rotate when the ratchet wheel rotates. The washer 71 is preferably made of fiber, as it has been found that a metal washer wears so smooth that it permits too great freedom of action. This is not true of a fiber washer. It will be noticed that the feed shaft has a left-hand feeding screw, so that when the shaft is rotated clockwise, looking downward, the saw will be lowered. It will be seen by Fig. 11 that the ratchet wheel 70 is adapted to rotate the shaft clockwise, so that this wheel feeds the saw to its work. If it is desired to vary the depth of the cut, it is necessary only to vary the compression on the spring 73, increasing it to make the friction between the ratchet wheel and the adjacent parts greater, and thus making the cut deeper; or decreasing it to make the cut less; and this may be done at any time while the saw is in operation. It will be shown hereinafter that the ratchet wheel 70 is not operated during the return stroke of the saw, so that the feeding occurs only while the cutting stroke is being made.

It will also be seen that the teeth on the ratchet wheel 68 are adapted to operate the wheel in a counter-clockwise direction. This wheel, therefore, is adapted to raise the saw. The mechanism for operating these wheels comprises a duplex pawl 75 pivoted by a pivot 76 to the arm 67. The upper portion of this pawl is adapted to operate the wheel 70, and the lower portion the wheel 68, the two portions being integral; they may, however, be rigidly fastened together in any suitable manner. As the arm 67 oscillates around the shaft 56, the pawl is automatically caused to operate one or the other of the wheels, according to whether the saw is to be raised or lowered. A casing 77 incloses the feeding mechanism and supports the upper end of the feed-mechanism operating shaft 78. Fixed to this shaft is an arm 79 below the casing, and fixed to the shaft inside of the casing are two projections 80 and 81. These projections may be integral or fastened permanently together or to the shaft in any suitable manner. In this case I have made them integral. When the arm 79 is moved to the position 85, as shown in Fig. 11, the projection 80 is so placed as to come in contact with a stop 82 projecting from the piece 84 which is pivoted by the pin 76 to the arm 67. This turns the piece 84 to the position shown in Fig. 11, and the pawl 75 is rotated so as to coact with the ratchet wheel 70, as indicated.

If the arm 79 is turned to position 86, the projection 81 will strike the stop 83 and rotate the pawl into the position to coact with the ratchet wheel 68, as indicated in Fig. 13. Briefly, when the arm 79 is in position 85, the saw will be lowered, and with the arm in position 86 the saw will be raised.

As the arm 67 is operated by means of the rack 65 and the lever 61, it will make one complete oscillation during one rotation of the driving shaft. By an inspection of Fig. 1, it will be seen that while the saw is making its cutting stroke, which is the draw stroke, the upper end of the lever 61 will be pushed inwardly and the rack 65 will cause the arm 67 and its pawl to oscillate and if the arm 79 is in the position 85 the ratchet wheel 70 will be rotated by the pawl, and it will thus feed the saw to its work. But on the return stroke of the saw, it will be seen that the arm 67 carries the pawl in a reverse direction and hence no rotation of the ratchet wheel, and no feeding of the saw will occur, the springs 97 allowing the pawl to play loosely over the teeth.

If the arm 79 is moved to the position 87, neither the projection 80 nor 81 will come in contact with the stops 82 or 83. Hence if it is desired to operate the machine without feeding, the arm 79 is placed in the position 87; and the strap 88 is pulled outwardly by hand. The pins 89 set in the piece 84 will then come in contact with the flange 90, and this will cause the piece 84 and the pawl to take a neutral position, as indicated in Fig. 17, and no action of the ratchet wheels will occur. The strap 88 has an elongated opening through which the shaft 78 passes, the opening allowing sufficient transverse movement of the strap for the purpose indicated. The feed shaft may then be operated manually by means of the crank 74$^a$.

The piece 84 is locked in the neutral position by means of the pin 91. This pin plays in an open slot 92 in the arm 67, and is backed by a spring 93 which projects into the pin. When in the neutral position this pin enters the notch 94 in the piece 84 and thus retains it in position. When the pawl is thrown to the operative position, as indicated in Fig. 13, one of the shoulders 95 on the arm 67 holds the piece 84 from further rotation; and the pin 91 pressing against the incline 96 on the piece 84 tends to hold the piece from backward rotation. This tendency, however, is easily overcome by the opposite action of the projection 80 or 81 on the stops 82 or 83.

Another feature of my machine is the mechanism by which the stock is automatically moved into position for a new cut. This mechanism comprises means for opening and closing the jaws of the vise at the proper time, means for moving the stock into the proper position for the new cut, and means for properly raising and lowering the saw.

The means for operating the vise will first be described. Referring to Figs. 18, 19, 20 and 21: The jaw 24 of the vise is movable horizontally on guides 98 in the machine bed 4. These guides are parallel with the saw blade. The jaw 24 is clamped to the guides by means of the T-bolt 99 in the undercut slot 100. Integral with this jaw, or permanently attached to it in some suitable manner, is the plate 101 which may be also clamped to the guides by the T-bolt 102. On the upper surface of this plate are flanges 103 which form dovetail guides for horizontal movement of the jaw 23. Integral with the jaw 23, or attached thereto in any suitable manner, is a frame 104. The base of this frame has on its lower surface dovetail flanges or tenons 105 which enter the dovetail slot 106 formed by the flanges 103. Also playing in this slot 106 are the tenons 107 of the heel of a dog 108. On the upper surface of the plate 101, between the flanges 103, is a rack of ratchet teeth 109 which coact with the toe 110 of the dog, preventing movement of said dog backward away from the jaw 23, but allowing forward movement. The heel of the dog, however, has sufficient play in the slot to allow the toe to be raised from the rack and the dog to be moved backward. Passing through a lug 111 on the dog is a thumb screw 112 which presses against the plate 101 and when tightened clamps the tenons of the dog tightly against the flanges 103.

Between the dog and the jaw 23 is a member 113 which has on its lower surface a T-shaped projection 114, playing in the undercut slot 115 along the center of the forward portion of the base of the frame 104. In the horizontal slot 116 in this member is pivoted a roller 117. A lever 117ª is pivoted by a pivot 118 to two lugs 119 projecting upwardly from the dog 108. The inner end of this lever plays against the roller 117. When the lever is lowered to the position indicated by full lines in Fig. 18, the roller is pushed thereby inwardly carrying with it the member 113, and pressing the jaw 23 firmly against the stock to be operated on. When, however, the lever is raised as indicated by the dotted lines so that the roller passes into the depression 120 in the end of the lever, the jaw is allowed to move backward and loosen the stock. If desired, a cotter pin may be passed through the holes 121 in the lugs of the dog and in the lever, when the lever is lowered, and, with the thumb screw 112 loose, the toe of the dog may be lifted by the lever free from the rack 109, and the dog and member 113 and the jaw 23 moved backward freely.

In order to adjust more or less exactly the position of the jaw with reference to the stock when the lever is down, the member 113 has a slanting surface contact 122, Figs. 18 and 21, with a piece 181 which is pressed by the member 113 against the jaw 23. By means of the thumb screw 123 the members 181 and 113 may be pressed apart so as to force the piece 181 more firmly against the jaw 23.

The means for raising the lever 117ª so as to release the stock at the proper time comprises a rod 124 which has an angular projection 124ª at its lower end adapted to enter one of the holes 125 in the lever. The rod passes through a swivel stud 126 (Fig. 2) projecting from the bracket 12 which supports the saw frame. An adjustable collar 127 causes the rod and the lever to be raised whenever the saw frame is raised a sufficient distance. By means to be hereinafter described, when a cut is finished, the saw frame is automatically raised. This raises the lever 117ª and releases the stock. A weight 153 normally holds the outer end of the lever downward and maintains the pressure of the jaw firmly against the stock.

The means for moving the stock into position for a new cut will now be described. The stock is supported by a frame comprising two bars 128 passing transversely under the bed of the machine and having at their outer ends supporting legs (not shown). Mounted on the bars is a slidable vise or clamp 129. This vise, as indicated in Figs. 23 and 24, comprises two jaws 135 between which is placed the stock 22 to be cut. These jaws are slidably mounted on the member 135ª which in turn is slidably mounted on the bars 128. A roller 136ª which supports the stock, is journaled in the member 135ª, and passes loosely through the jaws 135, as best shown in Fig. 3. By means of the right and left-hand screw shaft 136 the jaws may be clamped against the stock, and when so clamped one of the jaws may be fixed to the roller by means of the thumb screw 137ª, thus holding the stock rigidly in place.

Attached to the vise is a flexible cable 130. This cable passes around a grooved pulley 131 and thence to a drum 132 fixed to the pulley 137. The drum and pulley are rotatably mounted on the shaft 133 which is rotatably supported by the end 134 of the lever 140.

The pulley 137 is rotated by the driving shaft 7, by means of a belt 138 and the pulley 35 fixed on the driving shaft. When the pulley is caused to rotate in the proper direction, the cable will be wound upon the drum, and the stock will be drawn forward for a new cut.

The belt 138 is normally loose so that it causes no rotation of the pulley 137. The lever 140 is pivoted at 141 to the frame of the machine. A torsion spring 142 (Fig. 3) has one of its ends fixed to the lever 140 and the other end to the pivot 141, and is under sufficient tension to balance the weight of the pulley 137 and the drum 132, and thus prevents downward pressure on the belt when the mechanism is in its inoperative position. The other end of the lever encircles a rod 144. This rod is attached to the saw frame bracket 12 and moves therewith. As the bracket rises after a cut is finished in the manner hereinafter to be shown, the rod 144 rises until the spring 145 supported by the nut 182 strikes the end of the lever and pushes it upward. This tightens the belt 135 and causes the pulley 137 and the drum 132 to rotate, and the cable 130 is turned on the drum and the stock pulled forward.

It will be noticed that the opening and the closing of the vise and the feeding of the stock depend directly upon the raising and lowering of the saw. The mechanism for controlling the raising and lowering of the saw comprises a pair of blocks 146 and 147, (Fig. 2) which are slidably mounted on vertical guides on the bracket 12 and are attached thereto by means of the T-bolts 148 playing in the T-slot 149 in said bracket. These blocks, by means of projections or cams 150 and 151, when the saw is raised or lowered the proper distance, come in contact with a pin 152 fixed in the rod 78 and cause this rod to rotate in one direction or the other. This, in turn, actuates the pawl 75 by means of the projection 80 or 81 and causes the screw-feed shaft 56 to be rotated in the proper direction. The block 146 is so positioned that as soon as the cut is finished the cam 150 will come in contact with the pin 152 and this will cause the rod 78 to rotate so as to throw the arm 79 into the position 86, and, as hereinbefore shown, this will cause the feed shaft to rotate in the direction necessary to raise the saw. As the ratchet wheel 68 which raises the saw is fixed to the shaft, the upward motion of the saw will be very rapid, so that no unnecessary time will be lost. The block 147 is positioned so that the cam 151 will come in contact with the pin 152 when the saw is raised to a sufficient height to clear the incoming stock. The cam 151 will then rotate the shaft 78 in the opposite direction, the feed wheel 70 will be caused to rotate and the saw will be started down. Until the saw comes in contact with the stock there will be no opposition to the feed and no slipping of the ratchet wheel, and hence the lowering to that point will be rapid. When the saw rises, the bracket will carry upward the end of the lever 117ª, the vise will thus be released and the stock will be drawn in by the cable 130.

The direction of rotation of the drum 132 is always such as to wind up the cable so that the stock will be drawn in until the end strikes on a stop 154, slidably mounted in a bracket 155 which is slidably mounted on one of the bars 128. As the tightening of the belt depends on the tension of the spring 145, when the stock strikes the stop 154 the spring will give sufficiently to allow the belt to slip until the spring is released by the downward movement of the rod 144, as the saw passes downward. As this rod is attached to the saw frame bracket 12 by means of the same T-bolt 148 that attaches the block 147 to the bracket, it will always be properly positioned to tighten the belt as soon as the saw is raised a sufficient height.

If the limit block 147 should become loose, or for any reason, fail to engage the pin 152, I have provided other means for releasing the clutch. Said means consists of a permanent knock-off 155ª fixed on the lower end of the bracket 12. This knock-off will come in contact with the stop 156 fixed on shaft 49, just before the bracket reaches the top of the guide, and will cause the shaft 49 to rotate clockwise, and will thus release the clutch. This device is used only as a safety device in case other means fail. In case of the downward limiting block 146 failing to act, no harm will result as the downward feeding mechanism is operated by friction, and will fail to act as soon as the opposing force becomes too great.

The blocks 146 and 147 are provided with elongated slots 146ª and 147ª, and may be shifted when desired away from the positions of contact with pin 152, and so that cam projections 157 and 158 thereon will come in contact with the stop 156. They will thus act as stops to rotate the shaft 49, and release the clutch. As the blocks 146 and 147 may be set at any desired position in the T-slot 149, the bracket may be stopped at any desired position when being raised or lowered. Either or both blocks may be set to act upon either the reversing pin or the releasing stop; so that the machine may be reversed or stopped with the bracket in any desired position while it is being either raised or lowered.

In order to automatically stop the machine when any predetermined number of pieces have been cut, a lever 159, (Figs. 2 and 3) pivoted to the bed at 160, by means of the shaft 78, has been provided. This lever has an arm 161. When the vise 129 which carries the stock moves inwardly to the desired point, the shoulder 162 will push the end 163 of the lever 159 inwardly and this will push the arm 161 of the lever outwardly against an arm 164 fixed on the shaft 49. The shaft 49 will thus be rotated and the clutch released in the manner hereinbefore described. By placing the shoulder 162 of the vise a distance from the lever end 163 approximately equal to the total length of the bar to be cut, this clutch releasing mechanism will be properly effective as soon as the desired number of cuts have been taken. The mechanism will also prevent the cutting off of pieces shorter than desired, because the end of the stock will fail to reach the stop 154 only when the shoulder 162 strikes the lever end 159 and stops the machine. A latch 167 is pivoted by the pivot 30 to the frame and is adapted to be turned upwardly so that the lug 168 will enter the T-slot 31 on the crank 32 and thus hold the crank immovably when it is desired to loosen or tighten the nut on the T-bolt 19 as indicated in Fig. 25.

In the leg 1 of the machine is placed an oil pump 169 which is operated by the driving shaft by means of a link 170, an arm 171 on the link 21, and the crank 32. Surrounding the pump is an oil well 172. When the pump is operated, oil from this well is drawn into the pump cylinder through the perforated inlet 173 and is then forced by the pump through the pipes 174 to an oil tank 179, with an overflow pipe 184. From the tank it flows through the regulating valve 176 and the pipe 185 to an outlet 175 over the saw blade. As the oil is used, it flows down into the panshaped bed 4 into the settling pan 177, where the metal chips settle, and from there into the well 172. The well may be drained by removing the plug 178.

If it is desired to cut stock at any angle between 45 degrees and a right angle, the T-bolt 102 in the feed plate 101 may be removed, the vise jaws turned on the bolt 99 to the angle desired, and the bolt 99 will then be sufficient to hold the vise in position.

It will thus be seen that the machine which I have invented is a completely automatic and adjustable machine tool. A bar of stock of any ordinary shape or size, or a number of bars together, may be placed in the machine, the proper adjustment made for cutting at any reasonable rate, any lengths, and any number of pieces, and the machine started, and no further attention will be required, even to stop the machine when it has cut up as long a bar or as many pieces as may be desired.

I claim as my invention:

1. In a power hacksaw, in combination, a saw; means for reciprocating said saw horizontally; means for feeding said saw to its work; means for holding stock to be sawed; automatic means for raising the saw to its initial position; means operated by said saw-raising means for releasing said stock-holding means; means operated by said saw-raising means for feeding stock for a new cut; and automatic means for throwing said saw out of operation when a predetermined amount of sawing has been done.

2. In a power hacksaw, in combination, a horizontally reciprocable saw mounted for vertical movement; means for reciprocating said saw horizontally; means for feeding said saw to its work; means for holding stock to be sawed; automatic means for raising the saw to its initial position; automatic means for releasing said stock-holding means when a cut is finished; means operated by said saw-raising means for feeding stock for a new cut; and automatic means for throwing said saw out of operation when a predetermined amount of sawing has been done.

3. In a power hacksaw, in combination, a saw blade; a saw frame supporting said blade; means for reciprocating said frame horizontally; means for feeding said saw to its work; means for holding stock to be sawed; automatic means for raising the saw to its initial position; automatic means for releasing said stock-holding means; automatic means for feeding stock for a new cut; and automatic means for throwing said saw out of operation when any desired portion of said stock has been sawed.

4. In a power hacksaw, in combination, a horizontally reciprocable saw mounted for vertical movement; means for reciprocating said saw horizontally; means for feeding said saw to its work; means for holding stock to be sawed; automatic means for raising the saw to its initial position; automatic means for releasing said stock-holding means; and automatic means for throwing said saw out of operation when a predetermined number of pieces have been sawed.

5. In a power hacksaw, in combination, a saw blade; a saw frame supporting said blade; means for reciprocating said frame horizontally; means for feeding said saw to its work; means for holding stock to be sawed; automatic means for raising the saw to its initial position; means operated by said saw-raising means for releasing said stock-holding means; and automatic means for throwing said saw out of operation when a predetermined amount of sawing has been done.

6. In a power hacksaw, in combination, a saw; means for reciprocating said saw horizontally; means for feeding said saw to its work; means for holding stock to be sawed; automatic means for raising the saw to its initial position; means operated by said saw-raising means for feeding stock for a new cut; and automatic means for throwing said saw out of operation when a predetermined amount of sawing has been done.

7. In a power hacksaw, in combination, a saw blade; a saw frame supporting said blade; means for reciprocating said frame horizontally; means for feeding said saw to its work; means for holding stock to be sawed; automatic means for raising the saw to its initial position; automatic means for feeding stock for a new cut; and automatic means for throwing said saw out of operation when a predetermined number of pieces has been sawed.

8. In a power hacksaw, in combination, a saw blade; means for reciprocating said blade horizontally; means for holding stock to be sawed; automatic means for raising the saw to its initial position when a cut is finished; means operated by said saw-raising means for releasing said stock-holding means; and automatic means operated by said saw-raising means for feeding stock for a new cut.

9. In a power hacksaw, in combination, a saw; means for reciprocating said saw; means for feeding said saw to its work; means for holding stock to be sawed; automatic means for raising the saw to its initial position; automatic means for releasing said stock-holding means; and means operated by said saw-raising means for feeding stock for a new cut.

10. In a power hacksaw, in combination, a saw; means for reciprocating said saw; means for feeding said saw to its work; automatic means for raising the saw to its initial position; means for varying the initial position of the saw; and automatic means for feeding stock for a new cut.

11. In a power hacksaw, in combination, a saw blade; a saw frame supporting said blade; horizontal guides reciprocally supporting said frame; vertical guides reciprocally supporting said horizontal guides; means for reciprocating said frame; means for feeding said saw to its work; means for holding stock to be sawed; and means including a portion of said feeding means for raising the saw to its initial position.

12. In a power hacksaw, in combination, a saw blade; a saw frame supporting said blade; horizontal guides reciprocally supporting said frame; vertical guides reciprocally supporting said horizontal guides; means for reciprocating said frame horizontally; means for feeding said saw to its work; means for holding stock to be sawed; automatic means for raising the saw to its initial position; and means operated by said saw-raising means for releasing said stock-holding means.

13. In a power hacksaw, in combination, a saw blade; a saw frame supporting said blade; means for reciprocating said frame; means for feeding said saw to its work; means for holding stock to be sawed; automatic means for raising the saw to its initial position; and means operated by said saw-raising means for feeding stock for a new cut.

14. In a power hacksaw, in combination, a saw; means for reciprocating said saw; means for raising the saw to its initial position; and means operated by said saw-raising means for feeding stock to said saw for a new cut.

15. In a power hacksaw, in combination, a saw; means for reciprocating said saw; automatic means for feeding said saw to its work; automatic means for moving said saw to its initial position when a cut is finished, and means for varying said initial position.

16. In a power hacksaw, in combination, a saw; means for reciprocating said saw horizontally; means for feeding said saw to its work; automatic means for raising the saw to its initial position; means for varying said position; and means, operated by said saw-raising means, for feeding stock for a new cut.

17. In a machine tool, in combination, cutting means; means for operating said cutting means; means for holding stock to be machined; means for feeding said cutting means to its work; automatic means for moving said cutting means to its initial position when a cut is finished; and automatic means for throwing said machine out of operation when a predetermined number of pieces have been machined.

18. In a machine tool, in combination, cutting means; means for operating said cutting means; means for holding stock to be machined; automatic means for releasing said stock-holding means when a cut is finished; automatic means for feeding stock to said cutting means for a new cut; means for feeding said cutting means to its work; automatic means for moving said cutting means to its initial position when a cut is finished; and means for varying said position.

19. In a machine tool, in combination, cutting means; means for operating said cutting means; means for feeding said cutting means to the work, automatic means for restoring said cutting means to its initial position; means for holding stock to be machined; and means for releasing said stock, said releasing means operated by said restoring means.

20. In a machine tool, in combination, cutting means; means for operating said cutting means; means for holding stock to be machined; automatic means for releasing said stock-holding means when a cut is finished; means for feeding said cutting means to the work; automatic means for moving said cutting means to its initial position when a cut is finished; and means for varying said position.

21. In a power hacksaw, in combination, a saw; a saw frame supporting said saw; means for reciprocating said saw; means for feeding said saw to its work; means for holding stock to be sawed; automatic means for raising the saw frame to its initial position; and automatic means for releasing said stock-holding means when a cut is finished comprising a lever and a rod connecting said lever to said saw frame.

22. In a power hacksaw, in combination, a saw blade; a saw frame supporting said blade; horizontal guides reciprocally supporting said frame; vertical guides reciprocally supporting said horizontal guides; means for reciprocating said frame horizontally; means for feeding said saw to its work; means for holding stock to be sawed; automatic means for raising the saw frame to its initial position; and automatic means operated by said saw-raising means for releasing said stock-holding means, comprising a lever and a rod connecting said lever to said horizontal guides.

23. In a power hacksaw, in combination, a saw blade; a saw frame supporting said blade; means for reciprocating said frame horizontally; means for feeding said saw to its work; means for holding stock to be sawed, comprising a vise; automatic means for raising the saw frame to its initial position; automatic means for releasing said stock-holding means comprising a lever and a rod connecting said lever to said frame; said vise comprising a fixed and a movable jaw; said lever pivoted to said vise; a member pressing against the said movable jaw, the pivoted end of said lever adapted to press against said member when the other end is lowerd and to release said member when the other end is raised.

24. In a power hacksaw, in combination, a saw blade; a saw frame supporting said blade; means for reciprocating said frame horizontally; means for feeding said saw to its work; means for holding stock to be sawed, comprising a vise and automatic means for releasing said stock-holding means comprising a lever; a rod connecting said lever to said frame; said vise comprising a fixed and a movable jaw, said lever pivoted to said vise; and a member pressing against said movable jaw, the pivoted end of said lever adapted to press against said member when the other end is lowered, and to release said member when the other end is raised.

25. In a power hacksaw, in combination, a saw blade; a saw frame supporting said blade; means for reciprocating said frame horizontally; means for feeding said saw to its work; means for holding stock to be sawed, comprising a vise, said vise being horizontally slidable and rotatable; and automatic means for releasing said stock-holding means.

26. In a power hacksaw, in combination, a saw; means for feeding said saw to its work; means for holding stock to be sawed, comprising a vise; means for adjusting said vise to hold stock of varying dimensions, said adjusting means comprising a coarse adjustment and a fine adjustment, said vise having a fixed and movable jaw, said coarse adjustment comprising a toothed rack and a block adapted to coact with said rack and to be clamped thereto adjacent said movable jaw, and said fine adjustment comprising two blocks having bevel surfaces in contact with each other, one of said two blocks pressing against said movable jaw and the other against said first mentioned block.

27. In a power hacksaw, in combination, a saw; means for holding stock to be sawed, comprising a vise; means for adjusting said vise to hold stock of varying dimensions, said adjusting means comprising a clamp slidably mounted on a toothed rack, and parts having coacting bevel surfaces slidable with relation to each other positioned between said clamp and said vise.

28. In a machine tool, in combination, cutting means; means for operating said cutting means; means for holding stock to be machined by said cutting means, said means comprising a vise; a lever pivoted to said vise; a movable jaw in said vise; a member pressing against said jaw, the pivoted end of said lever adapted to press against said member when the other end is lowered and to release said member when the other end is raised; and a link connecting said lever with the cutting means whereby when said cutting means are raised, said holding means are released.

29. In a machine tool, in combination, cutting means; means for operating said cutting means; a vise adapted to hold stock to be machined by said cutting means; and means for releasing said stock from said vise comprising a lever pivoted to said vise, a movable jaw in said vise, an adjusting member pressing against said jaw, a roller pivoted in said member, the pivoted end of said lever adapted to press against said roller when the outer end of said lever is lowered, said lever having a depression in its pivoted end, said depression so positioned as to receive the roller when the outer end of the lever is raised.

30. In a machine tool, in combination, cutting means; means for feeding said cutting means to the work; automatic means for restoring said cutting means to its initial position; a vise for holding stock to be machined; and means, operated by said restoring means, for releasing said stock, comprising a lever adapted to close said vise when the lever is lowered and to open said vise when the lever is raised.

31. In a machine tool, in combination, cutting means; means for holding stock to be cut; means for adjusting said stock-holding means to hold stock of varying dimensions, said adjusting means comprising a coarse adjustment and a fine adjustment; means for moving said cutting means to its initial position; and means operative by said moving means for releasing said stock.

32. In a machine tool, in combination, cutting means; means for holding stock to be cut; means for adjusting said stock-holding means to hold stock of various dimensions, said adjusting means comprising a coarse adjustment and a fine adjustment, said coarse adjustment comprising a clamp slidable on a toothed rack, said fine adjustment comprising two blocks having bevel surfaces movable with relation to each other, said blocks positioned between said clamp and said holding means.

33. In a power hacksaw, in combination, a saw blade; a saw frame supporting said blade; horizontal guides reciprocally supporting said saw frame; means for reciprocating said frame; means for feeding said frame to its work; means for holding stock to be sawed; means including a portion of said feeding means for raising the saw to its initial position; and means operated by said raising means for releasing said stock-holding means.

34. In a power hacksaw, in combination, a saw; means for reciprocating said saw; and automatic means for feeding stock for a new cut, comprising a shaft, a pulley fixed on said shaft, a drum fixed on said shaft, a driving shaft, a pulley fixed on said driving shaft, a loose belt connecting said pulleys, automatic means for tightening said belt, a cable attached at one end to said drum, and a slidable stock support, the other end of said cable attached to said support.

35. In a machine tool, in combination, cutting means; means for holding stock to be machined; automatic means for releasing said stock; and automatic means for feeding stock to said cutting means, comprising a drum, a cable operated by said drum, slidable stock-clamping means, said cable attached to said clamping means, and friction means for operating said drum.

36. In a machine tool, in combination, cutting means; means for operating said cutting means; automatic means for feeding stock to said cutting means comprising a drum, a cable operated by said drum, a slidable stock-clamping means, said cable attached to said clamping means, frictional means for rotating said drum, and automatic means for throwing said machine out of operation when a predetermined amount of machining has been done.

37. In a power hacksaw, in combination, a saw blade; a saw frame supporting said blade; horizontal guides reciprocally supporting said frame; vertical guides reciprocally supporting said horizontal guides; means for reciprocating said frame horizontally; and means for feeding said saw to its work, said feeding means comprising a screw, a ratchet wheel frictionally co-acting with said screw, and means for operating said ratchet wheel.

38. In a power hacksaw, in combination, a saw blade; a saw frame supporting said blade; horizontal guides reciprocally supporting said frame; vertical guides reciprocally supporting said horizontal guides; means for reciprocating said frame horizontally; means for feeding said saw to its work, said feeding means comprising a screw, a ratchet wheel frictionally co-acting with said screw, means for operating said ratchet wheel, and means for varying the friction between said ratchet wheel and said shaft.

39. In a power hacksaw, in combination, a saw blade; a saw frame supporting said blade; means for reciprocating said frame horizontally; means for feeding said saw to its work comprising a screw shaft, a ratchet wheel frictionally mounted on said shaft, a pawl co-acting with said ratchet wheel; and means for oscillating said pawl, comprising a rack, said rack connected with the said reciprocating means; and said pawl-oscillating means adapted to cause said pawl to coact with said wheel during the cutting stroke of said saw.

40. In a power hacksaw, in combination, a saw; means for operating said saw; means for feeding said saw to its work comprising a screw shaft; a collar fixed to said shaft; a disk mounted on said shaft above said collar; a ratchet wheel rotatably mounted on said shaft in frictional contact with said disk; a second collar slidably but non-rotatably mounted on said shaft in contact with said ratchet wheel, said second collar being pressed against said ratchet wheel by means of a spring; and automatic means for rotating said ratchet wheel during the cutting stroke of said saw.

41. In a power hacksaw, in combination, a saw; means for operating and feeding said saw; means for raising said saw back to its initial position, said raising means comprising a screw shaft; a ratchet wheel fixed on said shaft; a pawl adapted to co-act with said ratchet wheel; and automatic means for causing said pawl to co-act with said ratchet wheel when the cut is finished.

42. In a machine tool, in combination, cutting means therefor; automatic means for feeding said cutting means to the work; automatic means for restoring said cutting means to its initial position comprising a screw shaft supporting said cutting means; a ratchet wheel fixed on said shaft; a pawl adapted to co-act with said ratchet wheel; automatic means for causing said pawl to co-act with said ratchet wheel when the cut is finished; and automatic means for throwing said pawl out of co-action with said ratchet wheel when the cutting means are restored to the initial position.

43. In a machine tool, in combination, cutting means; means for moving said cutting means to its initial position; automatic means for feeding stock to said cutting means; a driving shaft; a clutch mounted on said shaft; automatic means for releasing said clutch when a predetermined amount of work has been machined; and automatic means for releasing said clutch when said means for moving said cutting means to its initial position fails to operate.

44. In a power hacksaw, in combination, a saw; means for reciprocating said saw; means for feeding said saw; a drive shaft; a clutch mounted on said shaft; means for raising said saw to its initial position; and means for releasing said clutch when said raising means fail to operate.

45. In a power hacksaw, in combination, a saw blade; a saw frame supporting said blade; means for reciprocating said saw blade; means for feeding said blade to the work; and means for horizontally moving said saw for varying the effective cutting portion thereof, said means comprising a rod threaded at one end into said frame, and threaded at the other end into a portion of said reciprocating means, said threads being oppositely pitched.

46. In a power hacksaw, in combination, a saw blade; a saw frame supporting said blade; horizontal guides reciprocally supporting said frame; a driving shaft; a crank on said shaft; a rod and a link connecting said crank and said frame, said rod being threaded into said frame at one end and into said link at the other end, one of said threads being right-handed and the other of said threads being left-handed.

47. In a power hacksaw, in combination, a saw blade; a saw frame supporting said blade; horizontal guides reciprocally supporting said frame; a driving shaft; a crank operated by said shaft; a wrist pin attached to said frame; a link attached to said crank; a wrist pin attached to said link; a connecting rod threaded at its ends into said wrist pins respectively, one of said threads being oppositely pitched; a set screw secured into the end of each of said wrist pins, whereby a piece of leather may be pressed between said respective threads and set screws.

48. In a power hacksaw, in combination, a saw blade; a saw frame supporting said blade; cylindrical pins connecting each end of said saw blade with said frame, each of said pins having a flat surface thereon; and two screws in said frame adapted to press on each of said flat surfaces, said screws respectively alined vertically.

49. In a machine tool, in combination, cutting means; means for operating said cutting means comprising a shaft, a crank on said shaft, said crank having a T-slot therein; a T-bolt in said slot; stock cutting means connected to said bolt; means connected to said bolt for feeding said cutting means to its work; a latch pivoted to said machine adjacent said crank; and a lug on said latch, said latch adapted to be rotated to insert said lug in said T-slot thereby preventing movement of said crank.

50. In a machine tool, cutting means; means for feeding said cutting means to its work comprising a vertical feed screw, said screw supported at its lower end by an adjustable ball bearing, said screw supporting said cutting means by means of a lug into which said screw is threaded; and an adjusting nut on said screw adjacent to said lug.

51. In a power hacksaw, in combination, a saw blade; a saw frame supporting said blade; means for operating said saw; means for feeding said saw to its work on the draw stroke; means for raising it from its work on the return stroke, said means comprising a spring tending to raise said saw; and a lever tending to depress said saw, said lever operated by said saw-operating means.

52. In a power hacksaw, in combination, a saw blade; means for raising said saw blade from its work on the return stroke, said means comprising a spring tending to raise said saw; a cam; means for operating said cam; a lever; one end of said lever tending to oppose said spring, the other end of said lever operated by said cam; the periphery of said cam being shaped so as to allow the spring opposing end of said lever to move upwardly on the return stroke of the saw.

53. In a power hacksaw, in combination, a saw; means for operating said saw; means for feeding said saw to its work; and means for raising said saw when a predetermined depth of cut has been made.

54. In a machine tool, in combination, cutting means; means for operating said cutting means; means for raising said cutting means when a predetermined depth of cut has been made; and means for controlling the height to which said cutting means are raised.

55. A hack saw having, in combination, a saw, a rotary shaft, a crank thereon, a rocking link having a sliding connection with said crank to be rocked by the latter, and a connecting device having oppositely pitched threads which are associated respectively with said rocking link and with the saw, whereby rotation of said connecting device will cause relative approaching and receding movement between the saw and said rocking link.

56. A hack saw having, in combination, a saw, a reciprocatory member, a connecting device having oppositely pitched threads which are associated respectively with the saw and with said member, whereby rotation of said connecting device will cause relative approaching and receding movement between the saw and said member, and means for reciprocating said member.

57. A hack saw having, in combination, a saw, a device for reciprocating the saw, a rod having oppositely pitched threads on its ends, one end being operatively connected to said device, a member having a swivel support on the saw, the other end of said rod passing through and being threaded in said member and a hand-wheel fixed on said rod for rotating the latter.

58. A hack-saw having, in combination, a saw support, a saw mounted on said support for horizontal reciprocation with relation thereto, an oscillatory link having a slot therein, a shaft having a crank playing in said slot for oscillating said link, a device connecting said link to the saw for reciprocating the latter, and means engaging said saw support and having a driving connection with said crank for feeding said saw support vertically.

59. In a hacksaw, the combination of a saw support, a saw mounted on said support for horizontal reciprocation with relation thereto, a screw-shaft operatively associated with the saw support to feed the saw to its work, and power-driven means having a frictional slip connection with said screw-shaft for automatically rotating the latter.

60. A hack saw having, in combination, a saw, an oscillatory link having a slot therein, a rotary shaft, a crank fixed on said shaft and having a radial slot, a device adjustably fixed in the slot in said crank and playing in the slot in said link for oscillating the latter, and a connection between said link and the saw for reciprocating the latter.

61. A hack saw having, in combination, a saw, means for reciprocating said saw, an upright screw shaft operatively associated with the saw, a ratchet wheel fixed on said shaft, a second ratchet wheel mounted for rotation with relation to said shaft, said ratchet wheels having a slip connection, and driving mechanism arranged to engage the loose ratchet wheel to feed the saw to its work, and arranged to engage the fixed ratchet wheel to elevate the saw.

62. In a hacksaw, the combination of a saw, a vertically disposed screw-shaft operatively associated with said saw for raising and lowering the latter, and means for rotating said screw shaft in opposite directions, said means having a positive engagement with the shaft to elevate the saw and having a slip engagement with the shaft to lower the saw.

63. In a hacksaw, the combination of a saw, a vertically disposed screw-shaft associated with the saw for raising and lowering the latter, reversible means for driving said screw-shaft in opposite directions, and adjustable means operating in the traveling movement of the saw for reversing said driving means.

64. In a hacksaw, in combination, a supporting structure, a bracket mounted for vertical movement on said structure, a saw mounted on said bracket for horizontal reciprocation, means for reciprocating the saw, a vertically disposed screw-shaft associated with said bracket for raising and lowering the bracket and the saw, reversible means for rotating said screw-shaft in opposite directions, and adjustable means arranged to be operated in the vertical travel of the bracket and the saw for reversing said screw-shaft rotating means.

65. In a hacksaw, the combination of a saw, means for feeding the saw down to its work and for raising the saw at the end of a cut, and means for automatically reversing said feeding and raising means.

66. In a hacksaw, the combination of a saw, means comprising a screw-shaft and a pawl-and-ratchet device for raising and lowering said saw, and means for automatically reversing said pawl-and-ratchet device at the upper and lower ends of movement of the saw.

67. In a hacksaw, the combination of a main structure, a support mounted thereon for vertical movement, a saw mounted on said support, a vertically disposed screw-shaft associated with said support for raising and lowering the latter, a pawl-and-ratchet device for rotating said screw-shaft, and means including adjustable stops on said support for reversing said pawl-and-ratchet device.

68. In a hacksaw, the combination of a main structure, a support mounted thereon for vertical movement, a saw mounted on said support for horizontal reciprocation, a vertically disposed screw-shaft associated with said support for raising and lowering the latter, a reversible pawl-and-ratchet device for rotating the screw-shaft in either direction, a vertically disposed rock-shaft arranged to reverse said pawl-and-ratchet device, and adjustable stops on said support adapted to rotate said rock shaft.

69. In a hacksaw, the combination of a saw mounted for horizontal reciprocation, a support therefor mounted for vertical movement, reversible means for raising and lowering said support, and means including a pair of stops mounted on said support for reversing said raising and lowering means.

70. A hack saw having, in combination, a saw, means for reciprocating the saw, an upright screw shaft operatively associated with the saw, a ratchet wheel having a slip connection with said screw shaft, and means comprising a pawl engaging said ratchet wheel for rotating said shaft.

71. A hack saw having, in combination, a saw, means for reciprocating the saw, a screw shaft for feeding the saw against the work, driving means, and a slip connection between said driving means and said screw shaft.

72. A hack saw having, in combination, a support mounted for movement up and down, a saw mounted on said support for horizontal reciprocation, an upright screw shaft associated with said support to move the latter, and means including a frictional slip device for rotating said screw shaft.

73. In a hacksaw, the combination with the saw and reciprocating means therefor, of spring means tending to raise the saw, and intermittently acting means opposing said spring means and arranged to press the saw to its work on the cutting stroke only.

74. In a hacksaw, the combination of a saw mounted for horizontal reciprocation, a vertically movable support for the saw, means arranged to intermittently engage the support and press the saw downwardly to the work on its cutting stroke, and spring means acting to raise the saw on the return stroke thereof.

75. A hack saw having, in combination, a support mounted to move up and down, a saw mounted on said support for horizontal reciprocation with relation to said support, means for automatically moving said support up or down, and means including a stop device mounted on said support for controlling said moving means.

76. In a hacksaw, the combination with the work-holding means and the sawing means, of means for feeding the work, comprising a device arranged to support the work and mounted for traveling movement in a substantially horizontal plane with relation to said work-holding means, and means attached to said device and arranged to automatically draw the latter toward said work-holding means to feed the work into said holding means when the sawing means has completed a cut.

77. In a hacksaw, the combination with the work-holding means and the sawing means, of means for feeding the work comprising a vise mounted for traveling movement with relation to said work-holding means, and means attached to said vise and arranged to automatically draw the latter horizontally toward said work-holding means to feed the work at the proper time.

78. In a hacksaw, the combination of a stationary vise, sawing means to act upon the work clamped by said vise, means for automatically raising the saw at the finish of a cut, horizontal guide means, a second vise mounted to travel on said guide means, and means automatically operating to draw the second vise along said guide means toward said stationary vise when the saw rises after completing a cut.

79. In a hacksaw, the combination of a vise, sawing means to act upon the work held by said vise, mechanism for automatically raising and lowering the saw and for opening and closing said vise, work-engaging means mounted for traveling movement in a substantially horizontal plane, and means automatically operating when the saw is raised to draw said work-engaging means toward the first mentioned work-holding means when the latter is opened.

80. In a hacksaw, the combination of stationary work-holding means, sawing means, work-feeding means comprising a part mounted for traveling movement and adapted to engage the work, a throw-out clutch for stopping said sawing means and said work-feeding means, and means operable by said traveling part for actuating said clutch.

81. In a hacksaw, the combination of stationary work-holding means, sawing means, a drive-shaft operatively connected to said sawing means, a drive-pulley on said shaft for rotating the shaft, clutch means to connect said pulley to said shaft, work-feeding means comprising a traveling part, and means arranged to be engaged by said traveling part for actuating said clutch to disconnect the drive-pulley from said shaft.

82. In a hacksaw, the combination of a saw mounted for movement up and down, means for driving the saw, and work-holding means and work-feeding means operatively connected to the saw whereby the saw in its rising movement will actuate said holding and feeding means.

83. In a hacksaw, the combination of a saw mounted for horizontal reciprocation and for movement up and down, work-holding means, and an operative connection between said work-holding means and the saw whereby the rising movement of the saw will operate said work-holding means.

84. In a hacksaw, the combination of a horizontally reciprocatory saw, a vertically movable support therefor, a work-holding vise having an operating lever, and a link connecting said lever to said saw support, whereby the vertical movement of said saw support will operate said vise.

85. In a hacksaw, the combination of a horizontally reciprocatory saw, a vertically movable support therefor, a work-holding vise having an operating lever, a weight on said lever acting to close the vise, and a link connecting said lever to said support whereby the upward movement of the support and the saw will open the vise.

86. In a hacksaw, the combination of a saw, means for horizontally reciprocating the saw, means for vertically moving said saw, and a work-holding vise operatively connected to the saw for actuation thereby.

87. In a hacksaw, the combination of a saw mounted for rising and falling movement, a stationary work-holding vise, a traveling work-feeding vise, a cable connected to said work-feeding vise, a drum upon which said cable is wound, and means actuated by the rising movement of said saw for causing rotation of said drum.

88. In a hacksaw, the combination of a saw mounted for rising and falling movement, a stationary work-holding vise, a traveling work-feeding vise, a cable connected to said work-feeding vise, a drum upon which said cable is wound, means actuated by the rising movement of said saw for causing rotation of said drum; and means actuated by the rising movement of said saw for opening said work-holding vise to permit the work to be fed thereinto.

89. A hacksaw having, in combination, a saw, a vertically disposed screw-shaft associated with the saw for raising and lowering the latter, reversible driving means which is arranged to rotate the shaft continuously in either direction, and adjustable means operating in the vertical movement of the saw for reversing said driving means.

90. A hacksaw having, in combination, a saw, means comprising a screw-shaft and a pawl-and-ratchet device for feeding the saw down to its work and for raising the saw above the work at the finish of a cut, and means for automatically reversing said pawl-and-ratchet device at the upper and lower ends of movement of the saw.

91. A hacksaw having, in combination, a saw support, a saw mounted on said support for horizontal reciprocation with relation thereto, a screw-shaft operatively associated with said saw support for feeding the saw to the work, power-driven means including a frictional slip device for automatically rotating said screw-shaft, and means for changing the degree of frictional pressure in said slip device.

92. A hacksaw having, in combination, a saw, an upright screw-shaft operatively associated with the saw for vertically moving the latter, spring means tending at all times to raise said shaft and lift the saw out of contact with the bottom of the kerf, and means acting intermittently in opposition to said spring means to press the saw against the work on the cutting stroke only.

93. A hacksaw having, in combination, a support mounted for vertical movement, a saw mounted thereon for horizontal reciprocation with relation thereto, means for reciprocating the saw, a screw-shaft having a threaded engagement with said support for vertically moving the latter, means tending at all times to raise said shaft and the saw, and means acting in opposition to the last named means for depressing the shaft on the cutting stroke of the saw.

94. A hacksaw having, in combination, a support mounted for movement up and down, a saw mounted on said support for horizontal reciprocation, means for raising and lowering the support to carry the saw toward and away from the work, and means including a pair of stops adjustably mounted on said support for controlling said raising and lowering means.

95. A hacksaw having, in combination, a support mounted for movement up and down, a saw mounted on said support for horizontal reciprocation, means for raising or lowering the support to carry the saw toward and away from the work, and means including a pair of stops adjustably mounted on said support for reversing said raising or lowering means.

96. A hacksaw having, in combination, a support mounted for movement up and down, a saw mounted on said support for horizontal reciprocation, a screw-shaft associated with said support to raise and lower the latter, reversible means for rotating said screw-shaft in opposite directions, and means including a pair of stops mounted on said support for reversing said screw-rotating means and at the upper and lower limits of movement of said support.

97. A hacksaw having, in combination, a saw mounted for horizontal reciprocation and also for movement up and down, means for feeding the saw vertically, and means including a device which moves vertically with the saw for controlling said feeding means.

98. A hacksaw having, in combination, a saw mounted for horizontal reciprocation and also for vertical movement, means for moving the saw vertically, means for reciprocating the saw, and means including a device which moves vertically with the saw for stopping the operation of said reciprocating means and said moving means.

99. A hacksaw having, in combination, a saw mounted for horizontal reciprocation and also for movement up and down, means for reciprocating the saw, means for moving the saw vertically, means for driving said reciprocating and said moving means, and means including an adjustable stop which moves vertically with the saw for disconnecting said driving means from said reciprocating and moving means.

100. A hacksaw having, in combination, a support mounted for movement up and down, a saw mounted on said support for horizontal reciprocation, means for reciprocating the saw, means for moving the support vertically, throw-out means for stopping the operation of said reciprocating and said moving means, and an adjustable stop mounted on said support and arranged to actuate said throw-out means.

101. A hacksaw having, in combination, sawing means, work-holding means and connections between said sawing means and said work-holding means whereby the work-holding means is released by the rising movement of the saw.

102. A hacksaw having, in combination, a saw mounted for reciprocation, a support therefor arranged to move up and down, work-holding means, and means connecting said work-holding means to said support to be operated by movement of the latter.

103. A hacksaw having, in combination, a saw, a support therefor mounted for movement up and down, a work-holding vise, and means connecting said vise to said support whereby the vise will be opened in the rising movement of the support to permit the work to be fed into the vise.

104. A hacksaw having, in combination, sawing means, a work-holding vise, means connecting said sawing means and said vise whereby the vise will be opened by the rising movement of the saw, and means for automatically feeding stock into the vise while open.

105. A hacksaw having, in combination, sawing means arranged for movement up and down, a traveling work-feeding device, a cable connected to said device, a drum on which said cable is wound, means having a slip connection with said drum for rotating the latter, and means actuated in the upward movement of said sawing means for tightening said slip connection to cause travel of said work-feeding device.

106. A machine tool having, in combination, a tool, a traveling work-feeding device, a cable attached to said device, a drum on which said cable is wound, and driving means for the drum which is controlled by the position of said tool.

107. A machine tool having, in combination, a tool, a traveling work-feeder, a cable attached to said work-feeder, a drum on which said cable is wound, means including a belt for driving said drum, and means for tightening and loosening said belt to control the travel of said work-feeder.

108. A hacksaw having, in combination, a saw mounted for rising and falling movement, a stationary work-holder, a traveling work-feeder, a cable attached to said work-feeder, a drum on which said cable is wound, means for opening said work-holder when the saw rises above the work, and means for rotating said drum when said work-holder is open.

109. A hacksaw having, in combination, sawing means, and work-holding means and work-feeding means directly controlled by the movement of said sawing means.

110. A hacksaw having, in combination, a saw, mechanism arranged to effect the downward feed of the saw and also the raising of the saw at the finish of a cut, and work-handling mechanism which is directly controlled by the movement of the saw.

111. A hacksaw having, in combination, a saw, means for horizontally reciprocating the saw, means for vertically moving the saw, and work-handling mechanism which is directly controlled by said vertical moving means.

112. A hacksaw having, in combination, a saw, means for horizontally reciprocating the saw, means for vertically moving the saw, and work-holding means and work-feeding means both directly controlled by the vertical movement of the saw.

113. A hacksaw having, in combination, a saw, means for horizontally reciprocating the saw, means for vertically moving the saw, a stationary work-holder, a traveling work-feeder, and means for actuating said work-feeder, the latter means and said work-holder being directly controlled by the vertical movement of the saw.

114. A hacksaw having, in combination, a saw support mounted for vertical movement, a saw mounted on said support for horizontal reciprocation with relation thereto, a stop adjustably mounted on said saw support, and mechanism arranged to be actuated by said stop for controlling the saw.

115. A hacksaw having, in combination, a saw support, a saw mounted on said support for horizontal reciprocation with relation thereto, a pair of stops adjustably mounted on said support, and mechanism arranged to be actuated by said stops in the up-and-down movement of the support for controlling the position of the support and the saw.

116. A hacksaw having, in combination, a horizontally reciprocatory saw, a support therefor mounted for movement up and down, a relatively stationary work-holder, a traveling work-feeder, means for actuating said work-feeder, an operative connection between the work-holder and the saw, and an operative connection between the work-feeder actuating means and the saw, whereby upward movement of the saw will open the work-holder and cause the work-feeder to feed work into the said work-holder.

In testimony whereof I affix my signature in the presence of two witnesses.

GEORGE J. BLUM.

Witnesses:
EARL C. CARLSON,
GEORGE L. CHINDAHL.

It is hereby certified that in Letters Patent No. 1,201,244, granted October 17, 1916, upon the application of George J. Blum, of Chicago, Illinois, for an improvement in "Power-Hacksaws," an error appears in the printed specification requiring correction as follows: Page 5, line 126, for the word "rotatably" read *non-rotatably;* and that the said Letters Patent should be read with this correction therein that the same may conform to the record of the case in the Patent Office.

Signed and sealed this 21st day of November, A. D., 1916.

[SEAL.]

F. W. H. CLAY,

*Acting Commissioner of Patents.*

Cl. 29—73.